US010334349B1

(12) United States Patent
Crowder

(10) Patent No.: US 10,334,349 B1
(45) Date of Patent: Jun. 25, 2019

(54) HEADPHONE-BASED LANGUAGE COMMUNICATION DEVICE

(71) Applicant: Mark Crowder, Evergreen, CO (US)

(72) Inventor: Mark Crowder, Evergreen, CO (US)

( * ) Notice: Subject to any disclaimer, the term of this patent is extended or adjusted under 35 U.S.C. 154(b) by 0 days.

(21) Appl. No.: 16/033,206

(22) Filed: Jul. 12, 2018

(51) Int. Cl.
*H04R 1/10* (2006.01)
*G06F 3/16* (2006.01)
*G10L 25/78* (2013.01)
*G06F 17/28* (2006.01)

(52) U.S. Cl.
CPC ........... *H04R 1/1041* (2013.01); *G06F 3/165* (2013.01); *G06F 17/289* (2013.01); *G10L 25/78* (2013.01); *H04R 1/1016* (2013.01); *H04R 2420/07* (2013.01)

(58) Field of Classification Search
CPC ........................... H04R 1/1041; H04R 1/1016; H04R 2420/07; G06F 3/165; G06F 17/289; G10L 25/78
See application file for complete search history.

(56) References Cited

U.S. PATENT DOCUMENTS

| | | | | |
|---|---|---|---|---|
| 9,438,294 | B2* | 9/2016 | Boesen | G10L 15/005 |
| 2010/0250231 | A1* | 9/2010 | Almagro | G06F 17/289 |
| | | | | 704/2 |
| 2011/0238405 | A1* | 9/2011 | Pedre | G06F 17/289 |
| | | | | 704/3 |
| 2013/0289971 | A1* | 10/2013 | Parkinson | G10L 15/26 |
| | | | | 704/2 |
| 2014/0113615 | A1* | 4/2014 | Yao | H04M 1/6066 |
| | | | | 455/418 |
| 2017/0039866 | A1* | 2/2017 | Coffee | G09B 5/04 |
| 2018/0182375 | A1* | 6/2018 | Fomin | G06F 17/289 |

* cited by examiner

*Primary Examiner* — Andrew L Sniezek
(74) *Attorney, Agent, or Firm* — Law Office of Mark Levy

(57) ABSTRACT

A language communication device in the form of headphones. The headphones have two earpieces, each of the earpieces having a speaker, a first of the earpieces having a short range receiver for receiving audible signals representative of a first language, and a second of the earpieces having a short range transceiver. A microphone input unit is also provided. A control unit connected to the earpieces has a memory device and a translation unit for translating the first language into another language. Software resides in the control unit. A momentary switch is provided for allowing a user to access the software. The language communication device also has a mechanism for receiving a content stream such as music from an external source, which content stream can be muted when the momentary switch is pressed by the user or the short range receiver detects audible signals representative of a language.

14 Claims, 10 Drawing Sheets

HEADPHONE-BASED LANGUAGE COMMUNICATION DEVICE

FIELD OF THE INVENTION

This invention relates to language communication devices in the form of headphones and, more particularly, to a headphone-based language communication device with foreign language translation.

BACKGROUND OF THE INVENTION

Typically, communication is said to be successful between two people if someone speaks and a listener can understand. In other words the intended recipient's brain language areas can comprehend the speech. The problem of not understanding the speech of others is the cause of language barriers. This invention discloses a method to solve the language barrier problem, interpreting the meaning of speech in one language to a language the recipient brain can comprehend.

Languages are mankind's principal tools for interacting expressing ideas, emotions, knowledge, memories and values. Languages are also primary vehicles of cultural expressions and intangible cultural heritage, essential to the identity of individuals and groups. Safeguarding endangered languages is a crucial task in maintaining cultural diversity worldwide. According to researchers more than 6,700 languages are spoken in 228 countries.

Most individuals living in the United States read, write, speak, and understand English. There are many individuals, however, for whom English is not their primary language. The 2000 census showed that 26 million individuals spoke Spanish and almost 7 million individuals spoke an Asian or Pacific Island language at home. If these individuals have a limited ability to read, write, speak, or understand English, they are limited English proficient. In a Supplementary Survey by the U.S. Census Bureau, 33% of Spanish speakers and 22.4% of all Asian and Pacific Island language speakers aged 18-64 reported that they spoke English either "not well" or "not at all."

In the field of entertainment, someone who wants to watch a foreign movie/performance experiences problems in clearly understanding the event.

Language barriers and misunderstandings can get in the way of effective communication and create complications in the workplace, including problems with safety. A recent Business Journal article on the rising number of foreign national workers in Charlotte-Mecklenburg's construction industry stated that workers who speak little or no English are at much greater risk of having an accident on the job because of not having a full grasp of safety standards.

Approximately 22% of the Sheraton Corporation's workforce is Hispanic, primarily Mexicans. Language is the main barrier here. To help its employers deal with the language challenge, the company has bilingual employees to serve as translators and mentors. In addition, all printed material is provided in both the essential languages Spanish and English. In the Woonsocket Spinning Company, 70% of the employees are foreign-born. Overcoming language barriers is the greatest challenge for both workers and the employer. To help with this, the company hires interpreters or has other employees who speak the language help the non-English speaking employees, particularly during orientation and training. Studies like these suggest companies spend a great amount of time and effort to overcome language barriers among employees.

Patients from under developing countries seeking medical care must be accompanied with human translators to explain their medical problems and also to understand physician's advice. The Connecticut Health Foundation found that use of language interpretation services in medical settings is limited, resulting in problems such as misdiagnosis and patient misunderstandings about doctors' instructions.

In the ever growing IT industry people from various nationalities collaborate in meetings and conferences. Due to language barrier, they cannot communicate freely, resulting in business people investing time and money learning new languages.

Even in marketing, due to language as barrier quality retail and consumer product owners struggle to market their products on international market.

Law enforcement and/or emergency medical service (EMS) personnel are often confronted with injured or physical impaired individuals in need of medical attention. When the police/EMS are on the scene, and the victim does not speak or understand English, this language barrier can make the job for the police/EMS workers more difficult. Instead of being able to assist the victim immediately, such rescue personnel must have a human translator in order to know what may be wrong and to be able to assist the victim properly.

It would be advantageous to provide a device to allow the police/EMS workers to understand the victim in need of assistance by automatically translating any spoken language.

DESCRIPTION OF RELATED ART

U.S. Pat. No. 9,672,210 issued to Osterhout for LANGUAGE TRANSLATION WITH HEAD-WORN COMPUTING, issued on Jun. 6, 2017, describes a language translation system with a head-worn computer. The head-worn computer includes a microphone and an audio communication system. The microphone is associated with a processor and is used to record a spoken utterance of a person wearing the head-worn computer. The head-worn system is adapted to convert the spoken utterance into a language other than a first spoken language represented by the spoken utterance, forming translated language. The converted language can then be played in an audio system such that the converted language is played through an associated speaker system.

U.S. Pat. No. 9,438,294 issued to Boessen for VOICE COMMUNICATION DEVICE WITH FOREIGN LANGUAGE TRANSLATION, issued on Sep. 6, 2016, describes methods and devices for voice communications and foreign language translation. One method includes selecting one of a plurality of microphones of an earpiece unit, receiving a selected voice communication of a first language from the selected microphone and translating the selected voice communication from the first language to a second language, the second language different from the first to create a translated voice communication, and transducing the translated voice communication at a speaker within the earpiece unit.

U.S. Pat. No. 9,183,199 issued to Wu for COMMUNICATION DEVICE FOR MULTIPLE LANGUAGE TRANSLATION SYSTEM, issued on Nov. 10, 2015, describes a communication device for a multiple language translation system. The communication device allows users to communicate with others using their own preferred language and the communication device provides a translation for each user in their preferred language. The communication device comprises a wireless transceiver for communicating with other users, networks, and the Internet. Operation switches are provided for controlling operation of the communication device. Signal indicators visually show status or conditions. A user hears the translation via an earphone or sees the translation on a display. A remote control allows the communication device to be controlled remotely.

SUMMARY OF THE INVENTION

In accordance with the present invention, there is provided a language communication device in the form of headphones. The headphones have two earpieces, each of the earpieces having a speaker, a first of the earpieces having a short range receiver for receiving audible signals representative of a first language, and a second of the earpieces having a short range transceiver. A microphone input unit is also provided. A control unit connected to the earpieces has a memory device and a translation unit for translating the first language into another language. Software resides in the control unit. A momentary switch is provided for allowing a user to access the software. The language communication device also has a mechanism for receiving a content stream such as music from an external source, which content stream can be muted when the momentary switch is pressed by the user or the short range receiver detects audible signals representative of a language.

The language communication device also has a mechanism for receiving a content stream such as music from an external source. When the headphones are being used to listen to music, the user can change the sound and/or quality of sound (i.e., live band, bass, echo, studio, etc.) According to one embodiment of the present invention, when the user is not listening to music, the headphones automatically amplifies and enhances environmental sounds within 160 feet of the device in all directions.

Therefore, as a primary object of the present invention to improve upon the state of the art.

It is a further object of the present invention to provide a language communication device that will translate multiple foreign languages in real time.

Yet another object of the present invention is to speak to a party in the language that they understand.

Yet another object of the present invention is to provide the user with a device which will amplify/enhance sound and/or voices for the hard of hearing.

Yet another object of the present invention is to provide the user with a means to stream music and access to GPS instructions/tracking.

Yet another object of the present invention is to provide the user the ability to record up to 30 minutes of external audio, sounds, or languages.

Another object of the present invention is to provide the user with a device that is capable of listening to external audio in multiple directions within up to 160 degrees.

Yet another object of the present invention is to provide the user the ability to call 911 on voice command if the headphones are attached to any device with the capability of making calls.

Yet another object of the present invention to transfer its software capabilities to other devices.

These and other objects and advantages of the present invention are more readily apparent with reference to the following detailed description and the accompanying drawings.

BRIEF DESCRIPTION OF THE DRAWINGS

A complete understanding of the present invention may be obtained by reference to the accompanying drawings, when considered in conjunction with the subsequent detailed description, in which.

Like reference numerals refer to like parts throughout the several views of the drawings.

DETAILED DESCRIPTION OF THE PREFERRED EMBODIMENT

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

The invention is a language communication device in the form of headphones. The headphones have two earpieces, a microphone input unit, and a control unit connected to the earpieces. Software resides in the control unit. The language communication device also has a mechanism for receiving a content stream such as music from an external source.

Figure 1:
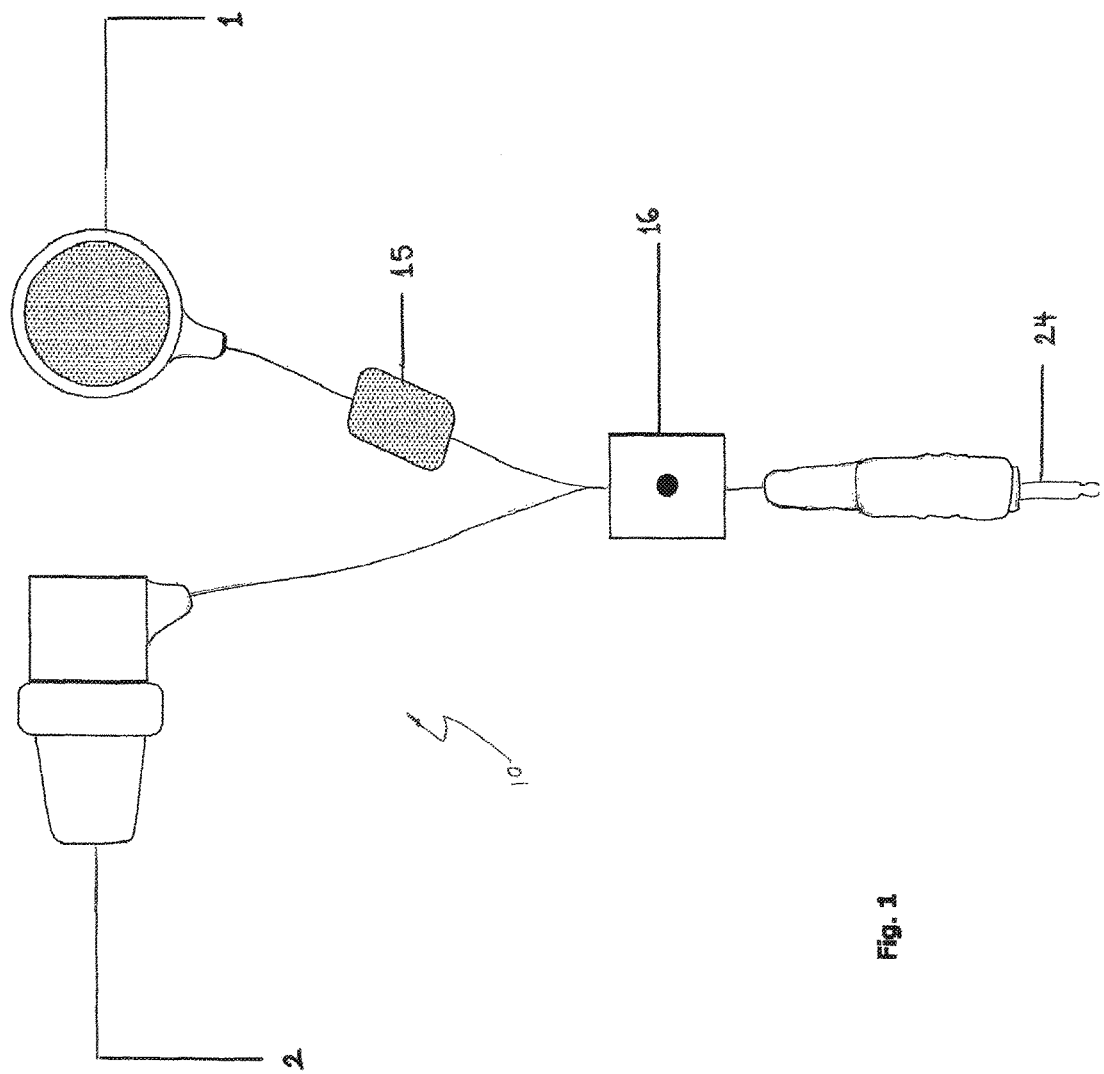
FIG. 1 is a pictorial representation of the headphones and the parts of the apparatus in accordance with the present invention.

Referring now to FIG. 1, there is shown a front view of one embodiment of the headphones according to the present invention. An external view of headphones 10 is shown, illustrating all of the surface features and their basic functions. The present inventive apparatus includes two earpieces 1 and 2, which include a speaker within each earpiece 1, 2 that fits onto the user's ears, not shown.

The headphones 10 include an omnidirectional receiver in each earpiece 1, 2 to pick up sounds and voices. The present invention keys in on any foreign languages other than the language that the user understands. The translation occurs in real time within each earpiece 1, 2.

In addition to being able to translate, all features are accessed by voice command. The headphones 10 include a microphone in a microphone input unit 15 so the user can speak into the system giving commands whenever a different feature or function is desired. The headphones 10 also include a control unit button (momentary electrical switch) 16 that the user must press while simultaneously speaking, giving commands, into the microphone input unit 15. If the user wants to respond to a party in a language that the listener understands, he speaks into the mouthpiece 15. For example, if the user wants to ask "what is your name" in Spanish, the user holds down the control unit button 16 while simultaneously speaking into the microphone input unit 15. Software responds according to the command, giving the user the proper way to ask "what is your name" in Spanish.

The system is also equipped with Internet access that can provide audible programming, such as music. When the user wants to activate any of the features while music is playing, he holds down the control unit button 16 to momentarily pause the music in one of the earpieces 1, 2 allowing access to the other feature. Furthermore, when the user is not listening to music the headphones 10 are automatically in translation and amplifier mode. When the user wants a language translated into a language he does not understand (e.g., English), the user holds down the control unit button 16 while simultaneously speaking "translate into English" into the microphone input unit 15. Whatever language is being spoken automatically translates into English and is audibly presented in real time.

When translation occurs, the headphones 10 transmit the signals representing languages to a translation unit 22 within each earpiece 1, 2, which translates the voice communication and transmits the resulting translation back to each earpiece 1, 2. The headphones 10 receive the translations and audibly presents the translated voice sound information through a speaker 1, 2 disposed within each earpiece 1, 2.

The present invention also allows a user to call up to twenty different numbers that can be stored in a call log of the headphones 10. In addition to the twenty numbers, 911 can be called. The user can call 911 if the need arises, and relay the receiving party the user's geographic location with a GPS tracking/instruction system. The 911 feature is stored in the software and is automatically accessible if the user is attached to a device that allows for outgoing/incoming calls, as with any other calls. To operate this feature, the user plugs headphones 10 into any unit that permits stored numbers to be uploaded, not shown, via suitable plug 24.

Figure 2:
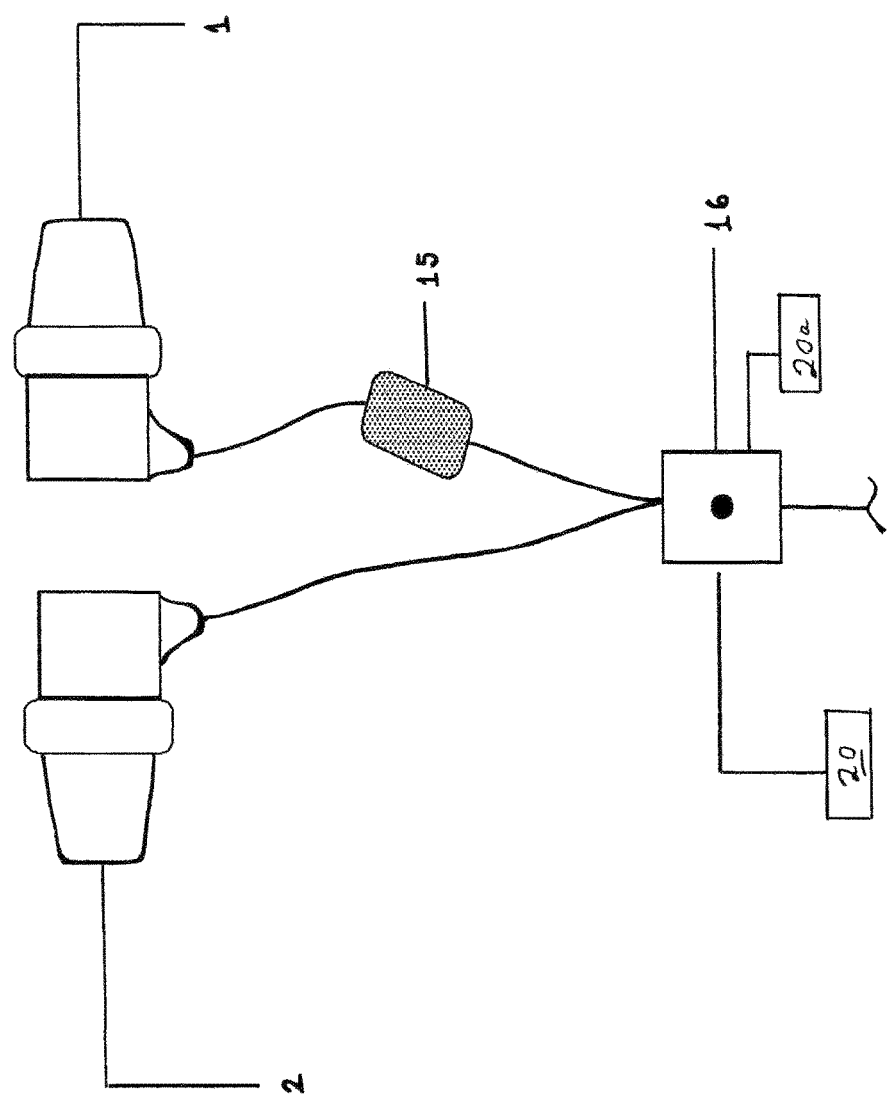
FIG. 2 is a pictorial representation of the non-occlusive earpiece and the dual components of the present invention.

Referring now also to FIG. 2, a diagram is shown of one embodiment of the headphones 10 according to the present invention. An external view of the headphones 10 shows certain secondary functions of those features. The two earpieces 1, 2 include a short range transmitter (TX) 19 for one ear and the a short range receiver (RX) 18 for the other. The control unit 16 housing holds streaming and recording memory software 20, 20a, respectively.

Figure 3:
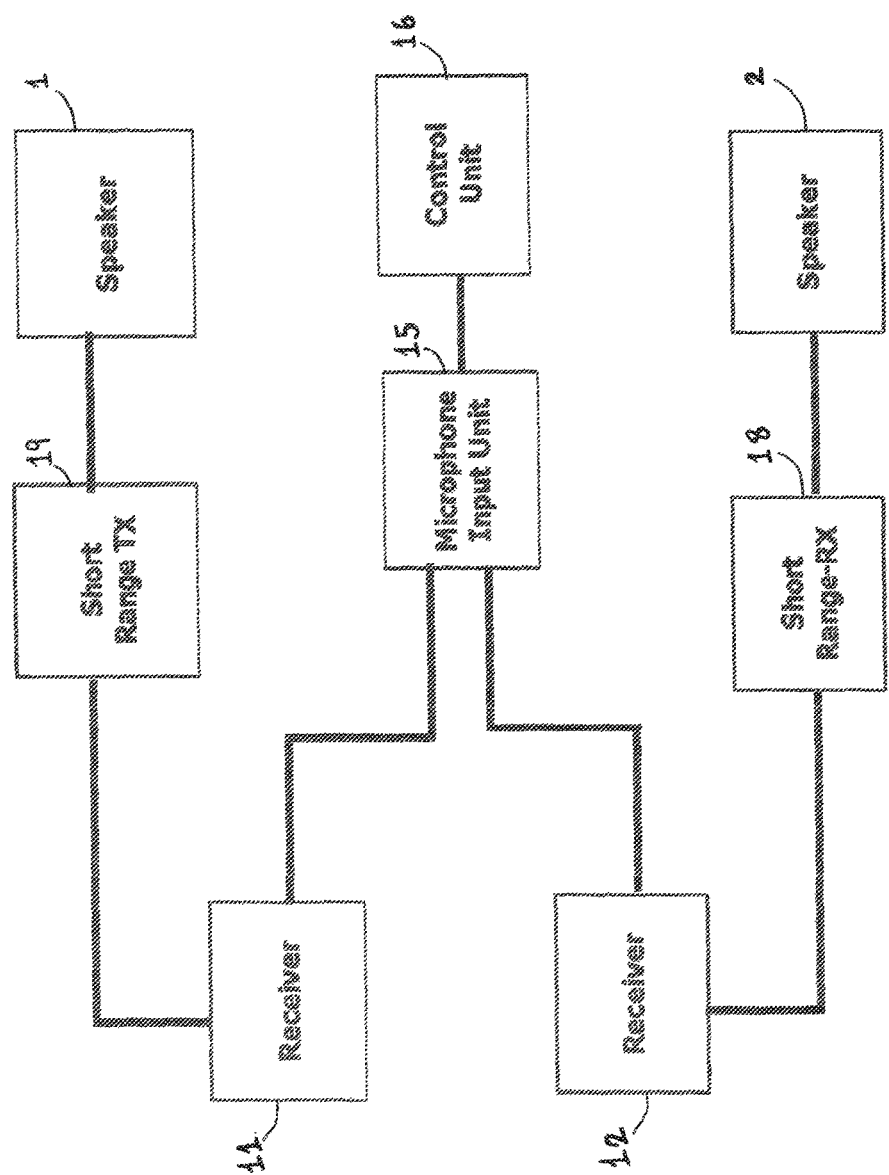
FIG. 3 is a block diagram of the electrical system of both earpieces and associated connecting parts.

Referring now also to FIG. 3, a block diagram of one embodiment of the headphones 10 is shown. Each earpiece 1, 2 includes an omnidirectional receiver 11, 12 respectively. Each of the receivers 11, 12 is electronically connected to the microphone input unit 15. The microphone input unit 15 is used to issue different commands that allow the user access to the different features.

The microphone input unit 15 is operatively connected to control unit button 16, which is used to ready the receiver 11, 12 for transmission over the short-range transceiver 19. As mentioned, the headphones 10 also include a short range receiver 18 within the earpieces 1, 2 operatively connected to respective speakers 1, 2. According to this embodiment of the present invention, if the user is not listening to music, both receivers 11, 12 are operational. The receivers 11, 12 are activated manually by pressing the button on the control unit 16, which mutes the music heard in one ear while a particular feature is being accessed. The sound information signal associated with the receivers 11, 12 (a language translation communication) is then received by the short range receiver 18 and transmitted to the speaker 2 such that the wearer of the headphones 10 hears the translated voice sound information.

Figure 4:
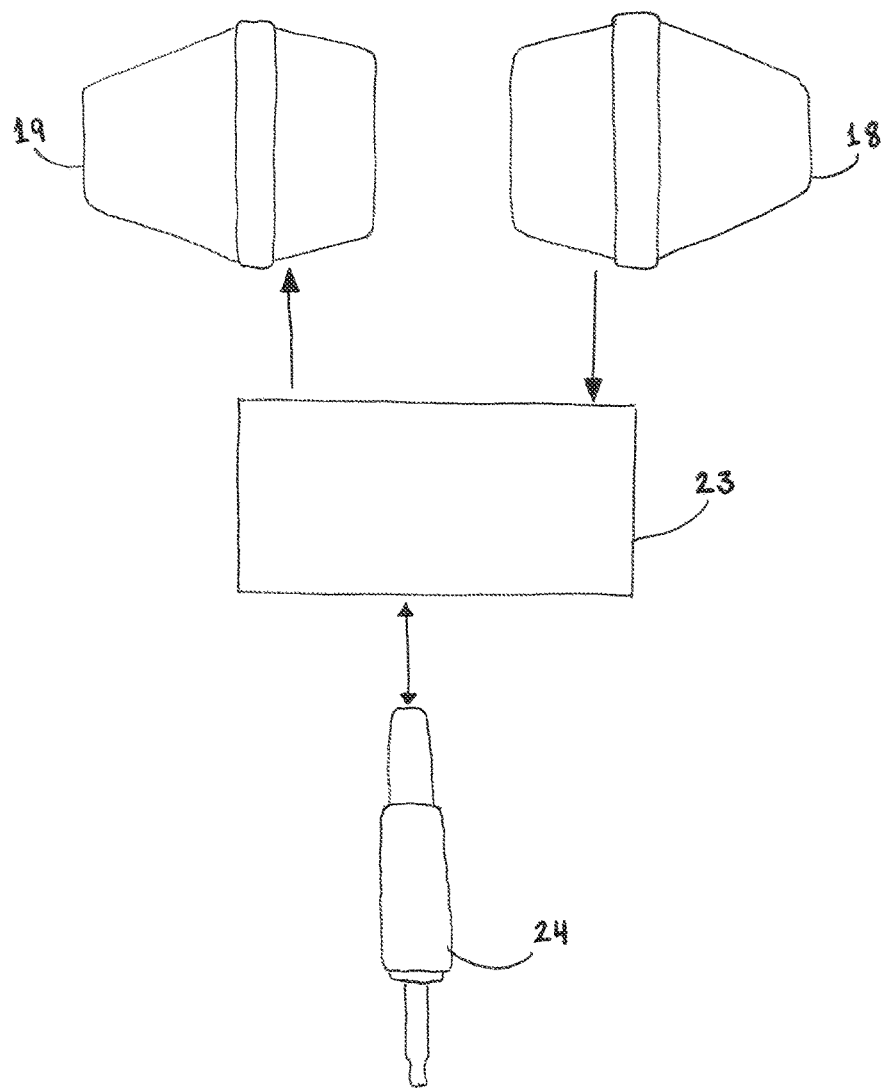
FIG. 4 is a diagram of one embodiment of the translation station with transferable capabilities.

Referring now to FIG. 4, a translation unit 23 is shown. Both the short-range receiver 18 and the short-range transceiver 19 are operatively connected to the translator 23, which receives transmissions of voice sound information of the language from earpiece 1 and then translates the voice sound information from the foreign language to a second language, sending the resulting translated voice sound information back to earpiece 2 through the short range transceiver 19. The system can transfer its translation capabilities to whatever electronic device (computer, laptop, app), not shown, that it is plugged into that allows for translation technologies. Once the two devices are connected, either device can to manually select or change any of the features through that device.

Figure 5:
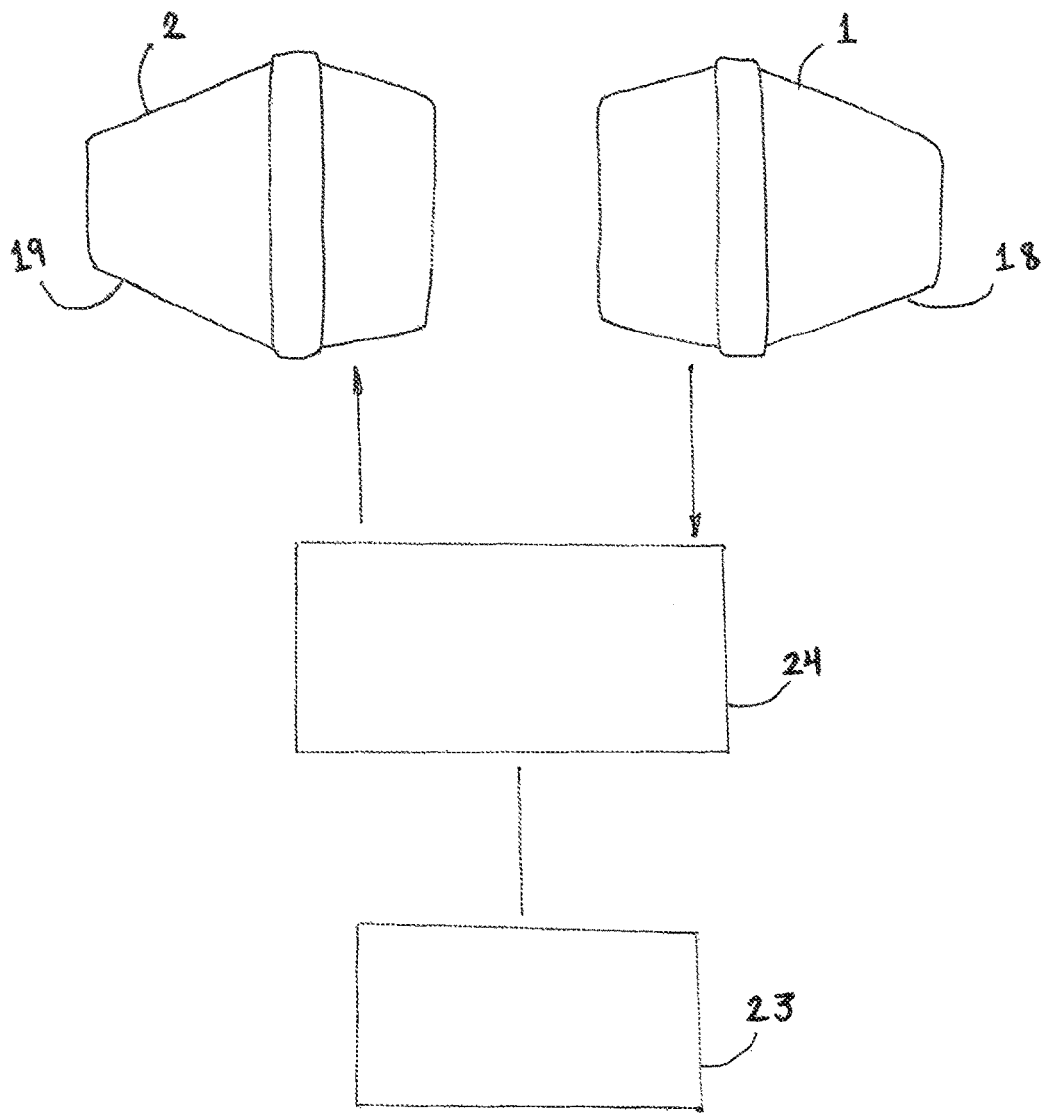
FIG. 5 is a diagram of another translation system.

Referring now to FIG. 5, a diagram is shown of another embodiment of the present invention. Translation unit 23 is in operative communication with the earpieces 1, 2. Short-range receiver 18 receives a foreign language from the receivers 1, 2. This information is then sent over a communications channel 24 to translator 23. In this implementation of the present invention, translator software is located within the earpieces 1, 2. The information received from the earpieces 1, 2 is effectively relayed across the communication channel 24. Similarly, information from the translator 23 is effectively relayed across the communications channel 24 back to the short-range transmitter 19 which is in operative communication with the earpieces 1, 2.

Figure 6:
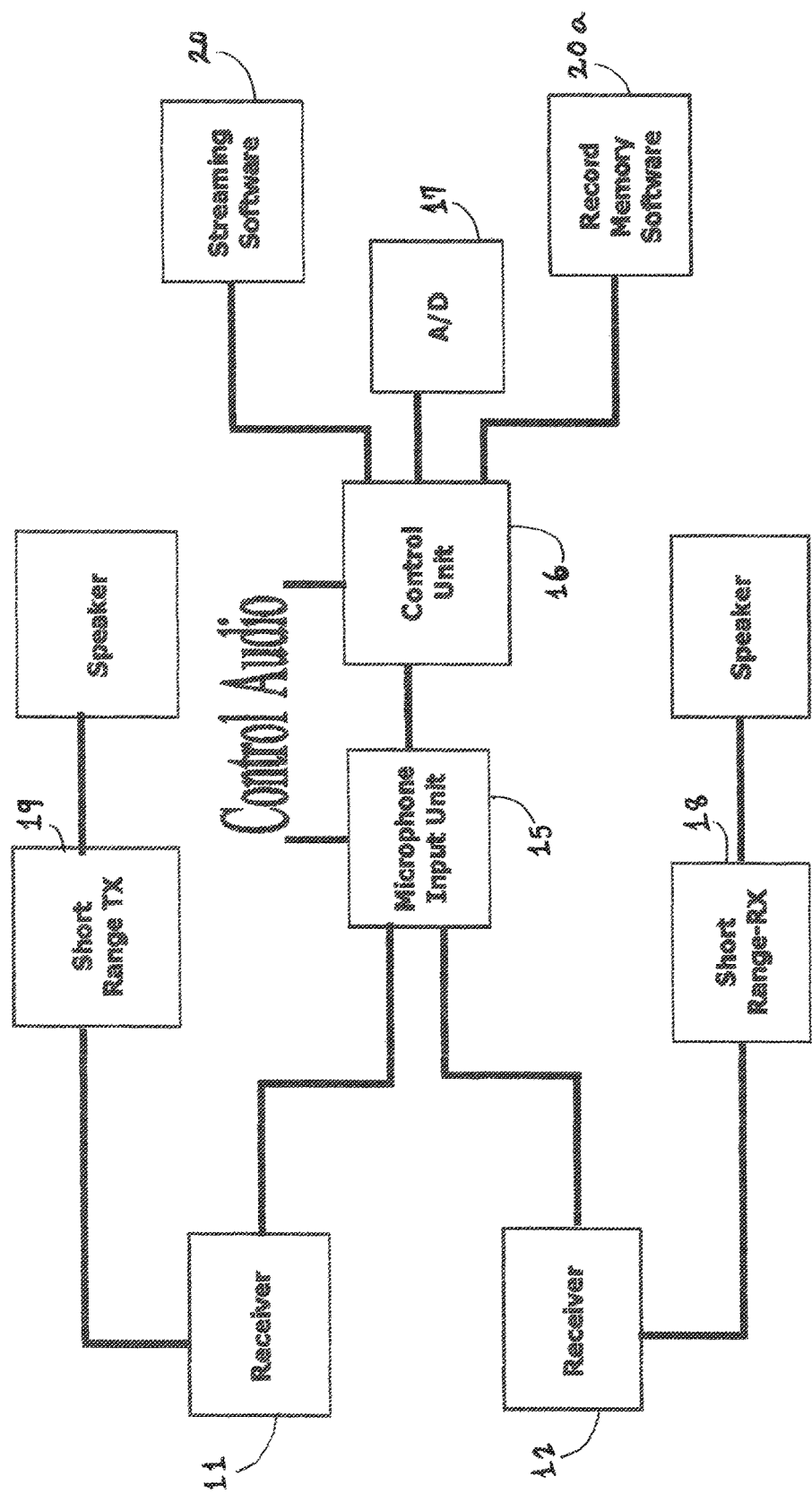
FIG. 6 is a block diagram of an electrical system of another embodiment of the headphones.

Referring now to FIG. 6, a diagram illustrates another embodiment of the present invention. Microphone input unit 15 is in operative communication with the earpieces 1, 2 and control unit 16, to which is operatively connected an analog-to-digital device 17. The microphone input unit 15 includes a front microphone input unit 15 directed in a forward direction. Receivers 11, 12 are electrically connected to the microphone input unit 15.

Figure 7:
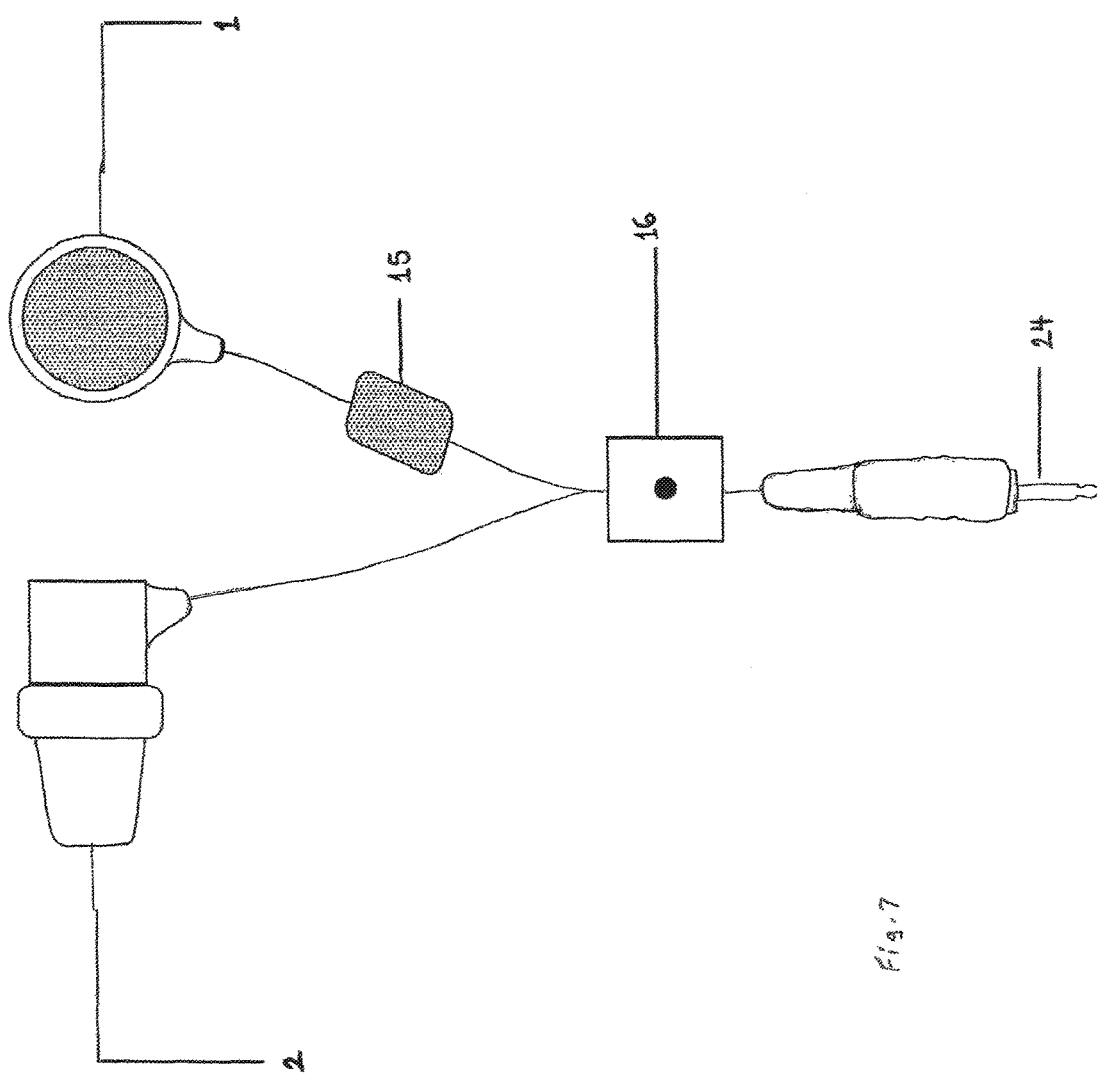
FIG. 7 is another block diagram of an electrical system of one embodiment of the headphones.

Referring now also to FIG. 7, a diagram is shown of another embodiment of the headphones 10 and control unit 16. Headphones 10 includes receivers 1, 2 that are electrically connected to microphone input unit 15 electrically connected to control unit 16. The control unit 16 is an intelligent control that can be used access to any of the features to be selected, including processors, digital signal processors, control circuits, and other types of intelligent controls, not shown. The control unit 16 is manually controlled by pressing momentary switch 16, activating the software and allowing access to all features by relaying input to the transmitter 19, which transmits the input to the proper control, opening up access by one simple command.

Figure 8:
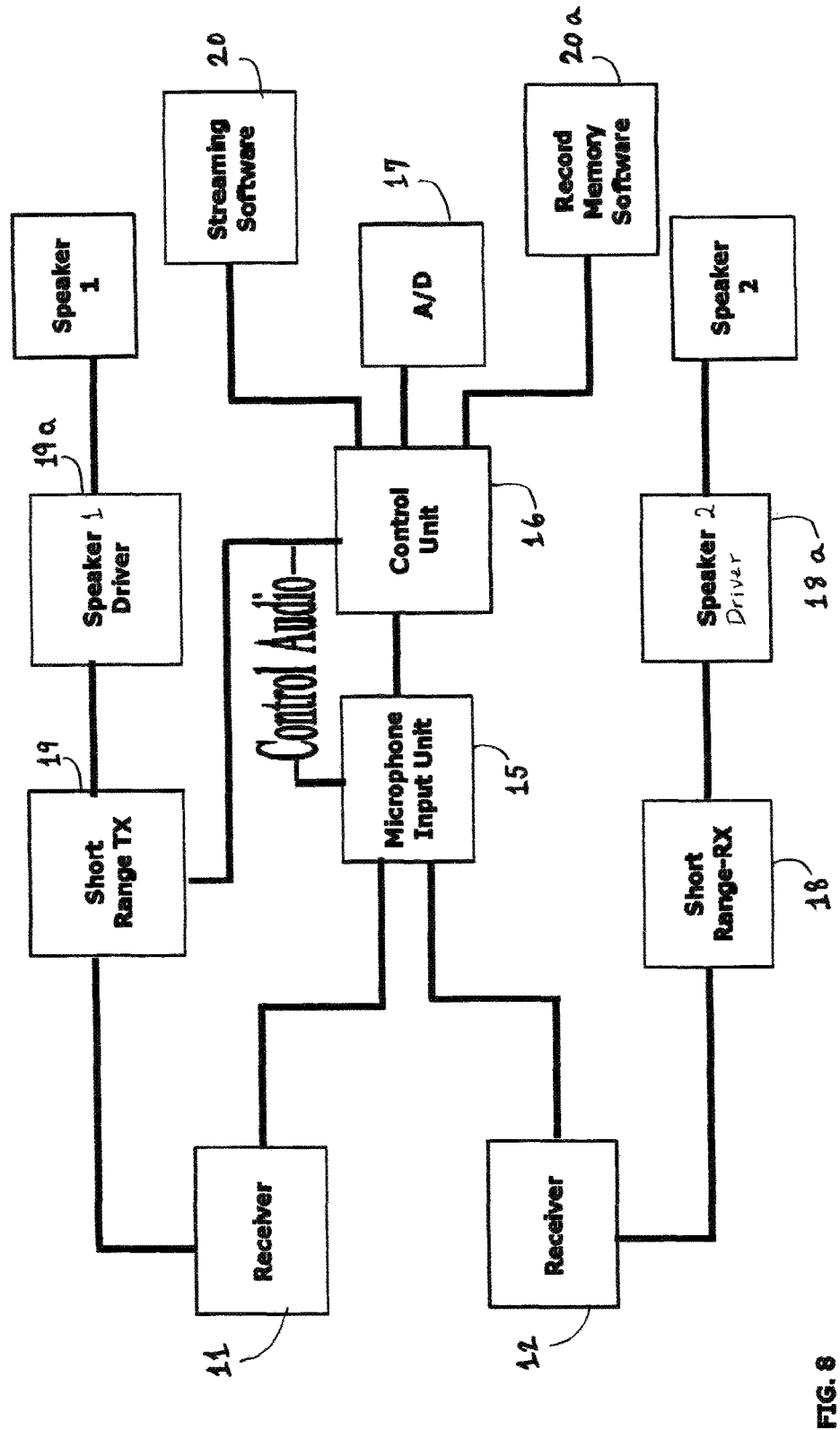
FIG. 8 is a block diagram of an electrical system of another embodiment of the headphones.

Referring now to FIG. 8, a block diagram is shown of another embodiment of the present invention. Audio (language) is received from both receivers 11, 12 to be output directly to the speakers 1, 2, as well as to the transmitter 19. A speaker driver 18a, 19a connected to each respective speaker 2, 1, can be switched on and off. This feature is useful when the audio/languages received from the receivers 11, 12 are amplified or are otherwise louder or clearer than that which the user would hear without the headphones 10. Thus, even if the user understands the language that is spoken and received, the system still provides advantages.

Figure 9:
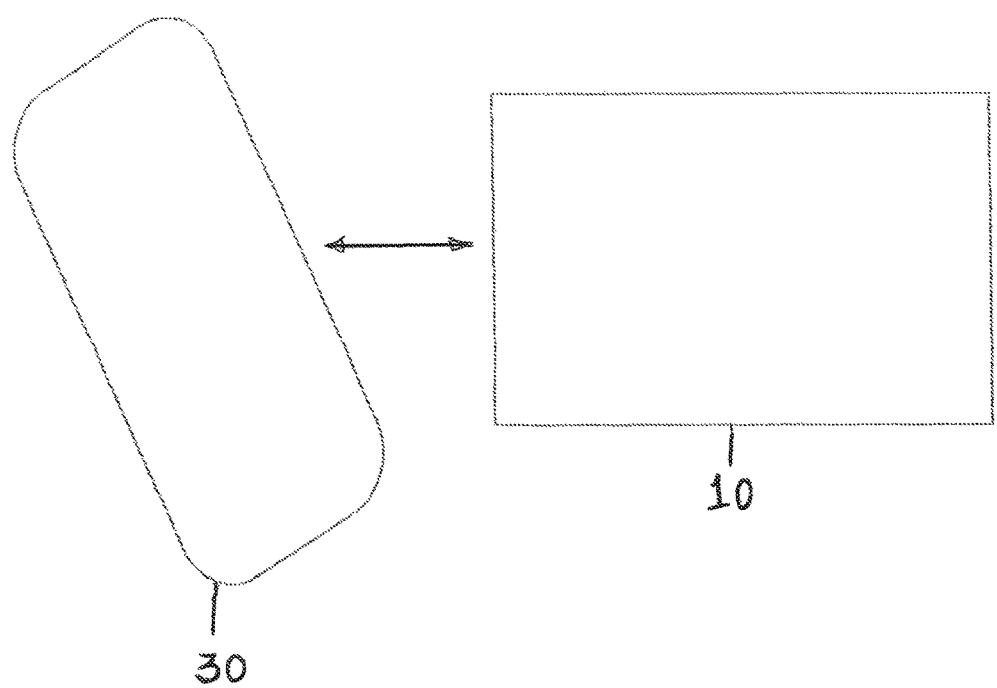
FIG. 9 is a diagram of an illustration of one or more implementations described herein.

Referring now to FIG. 9, an overview of another example implementation is illustrated. The headphones 10 may receive audio/music from and may output audio/music or translation audio, including translated speech, to another device 30 such as a smart phone or laptop.

Figure 10:
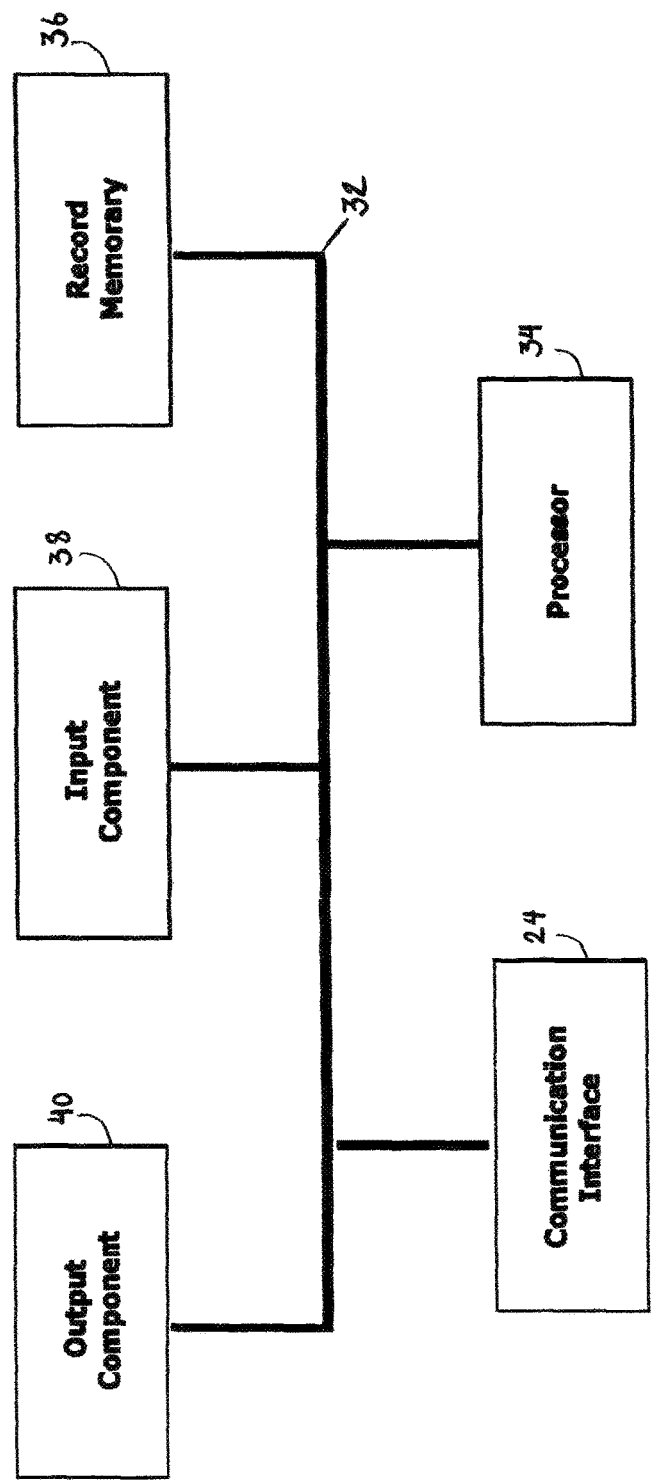
FIG. 10 illustrates example components of a device, in accordance with some implementations described herein.

Referring now to FIG. 10 there is shown a diagram of another embodiment of the present invention to explain some components of the headphones 10 and how the components work in conjunction with each other. The headphone 10 includes a communication bus 32, a processor 34, a memory 36, an input component 38, and an output component 40 connected to communication interface 24 via bus 32.

The bus 32 may include one or more communication paths that permit communication among the components of the system. The processor 34 includes processing logic to interpret and execute instructions. The memory 36 can be any type of dynamic storage device that stores information and instructions for execution by the processor 34 and/or it can be any type of non-volatile storage device that may store information for use by the processor 34. The input component 38 includes a mechanism that permits the user to input information to the system, such as a keyboard, a keypad, a button, a switch, etc., not shown. The output component 40 is a mechanism that outputs information to the user, such as a display, a speaker, one or more light emitting diodes (LEDs), etc., not shown.

The communication interface of the present invention includes a transceiver-like mechanism to enable the headphones 10 to communicate with other devices and/or systems. For example, the communication interface may include an Ethernet interface, an optical interface, a coaxial interface, or the like. The communication interface also includes a wireless communication device, such as an infrared (IR) receiver, a Bluetooth radio, and the like. This wireless communication device may be coupled to an external device, such as a remote control, a wireless keyboard, a mobile telephone, etc.

The present invention may perform certain operations relating to one or more processes described above. The headphones 10 may perform these operations in response to the processor 34 executing software instructions stored in a computer-readable medium, such as memory 36. A computer-readable medium is defined as a non-transitory memory device. The memory device 36 includes a space within a single physical memory device or, if the technology allows, spread across multiple physical memory devices. The software instructions (phone numbers) may be read into memory 36 from another computer-readable medium or from another device. The software instructions 20, 20*a* stored in memory 36 may cause processor 34 to perform the processes described herein. Alternatively, hardwired circuitry may be used in place of or in combination with software instructions to implement the processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modification and variations are possible in light of the above disclosure or may be acquired from practice of the implementations. For example, while the series of diagrams have been described with regard to all of the FIGURES, the order of the diagrams may be modified for operability in other implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may combine in ways not specifically recited in the claims and/or disclosed in the specification. Although each dependent claim listed below may directly depend on only one other claim, the disclosure of the possible implementations includes each dependent claim in combination with every other claim set.

Further, while certain connections or devices are shown, in practice, additional, fewer, or different connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A language communication device in the form of headphones, said headphones comprising:
   two earpieces, each of said earpieces comprising a speaker, a first of said earpieces having a short range receiver for receiving audible signals representative of a first language, and a second of said earpieces having a short range transceiver;
   means for receiving a content stream from an external source, wherein the content stream comprises music;
   a microphone input unit
   a control unit having a memory device and a translation unit for translating said first language into another language, software loaded in said control unit, and a momentary switch for allowing a user to access said software; and
   means for muting the music when the short range receiver detects audible signals representative of a language.

2. The language communication device in accordance with claim 1, wherein said momentary switch activates circuitry in said control unit.

3. The language communication device in accordance with claim 2, further comprising means for muting said music when said momentary switch is pressed by a user.

4. The language communication device in accordance with claim 1, further comprising an input component that permits a user to input information to the device, said input component being operatively connected to said control unit and comprising at least one device selected from the group: a keyboard, a keypad, a button, and a switch.

5. The language communication device in accordance with claim 1, further comprising an output component to output information to a user, said output component being operatively connected to said control unit and comprising at least one device selected from the group: a display, a speaker, and a plurality of light emitting diodes (LEDs).

6. The language communication device in accordance with claim 1, wherein said memory device comprises streaming and recording memory software.

7. The language communication device in accordance with claim 1, wherein said microphone input unit comprises an omnidirectional microphone.

8. A language communication device in the form of headphones, said headphones comprising:
- two earpieces, each of said earpieces comprising a speaker, a first of said earpieces having a short range receiver for receiving audible signals representative of a first language, and a second of said earpieces having a short range transceiver;
- a microphone input unit;
- means for receiving a content stream comprising music from an external source; and a control unit having a memory device and a translation unit for translating said first language into another language, software loaded in said control unit; and
- means for muting the music when the short range receiver detects audible signals representative of a language.

9. The language communication device in accordance with claim 8, wherein said control unit comprises a momentary switch for activating circuitry in said control unit.

10. The language communication device in accordance with claim 8, further comprising means for muting said music when said momentary switch is pressed by a user.

11. The language communication device in accordance with claim 8, further comprising an input component that permits a user to input information to the device, said input component being operatively connected to said control unit and comprising at least one device selected from the group: a keyboard, a keypad, a button, and a switch.

12. The language communication device in accordance with claim 8, further comprising an output component to output information to a user, said output component being operatively connected to said control unit and comprising at least one device selected from the group: a display, a speaker, and a plurality of light emitting diodes (LEDs).

13. The language communication device in accordance with claim 8, wherein said memory device comprises streaming and recording memory software.

14. The language communication device in accordance with claim 8, wherein said microphone input unit comprises an omnidirectional microphone.

\* \* \* \* \*